Nov. 12, 1963 J. S. HILL 3,110,089
METHOD OF BONDING AMALGAM INSERTS IN CAVITIES AND STRUCTURE THEREBY PRODUCED
Filed Dec. 16, 1959
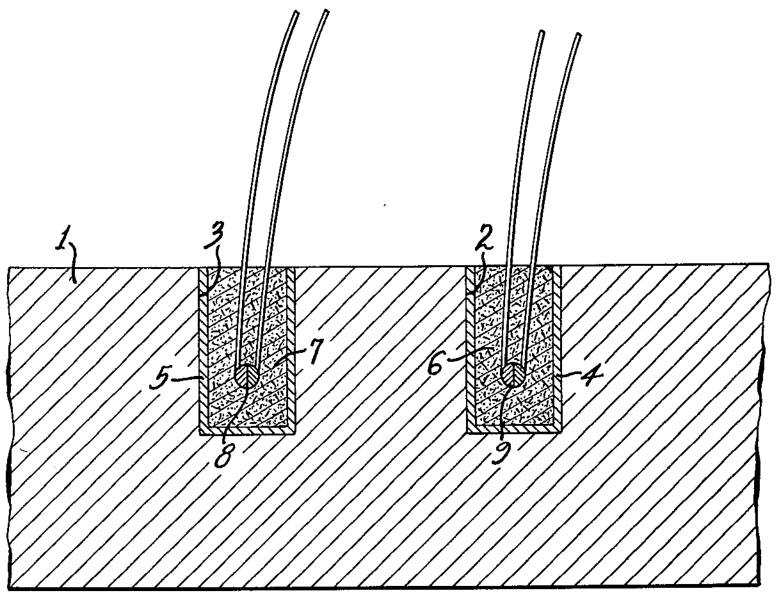
INVENTOR.
JAMES S. HILL
BY Karl Huber
James E. Bryan
Alan C. Rose
ATTORNEYS 3,110,089
Patented Nov. 12, 1963

3,110,089

METHOD OF BONDING AMALGAM INSERTS IN CAVITIES AND STRUCTURE THEREBY PRODUCED

James S. Hill, Cranford, N.J., assignor, by mesne assignments, to Engelhard Industries, Inc., Newark, N.J., a corporation of Delaware Filed Dec. 16, 1959, Ser. No. 859,915
4 Claims. (Cl. 29—155.55)

The present invention deals with the method of bonding amalgam inserts in cavities and more particularly with the method of bonding amalgam inserts in cavities in a metal base and the structure thereby produced.

It is well established that amalgams do not bond equally well to all metals, and that where the amalgam does not ordinarily bond well to a metal, a bonding or wetting agent is employed as a layer on the metal base to permit the mercury of the amalgam to combine with the agent on the metal base permitting wetting of the surface by the mercury and the consequent bonding of the amalgam. For example, in bonding an amalgam such as silver amalgam to a metal base composed of a low carbon steel, a layer of, for example, gold, is electroplated on the base to which the amalgam is applied. Ordinarily, the surface of the metal base is first etched, and the gold is plated to the etched surface. While electroplated surfaces are satisfactory as bonding agents for amalgam in certain cases, e.g. flat surface bonding, such electroplating surfaces are not entirely satisfactory where the surface is either irregular or has cavities therein. In the latter case, the electroplated layers are non-uniform in thickness with some portions being over plated, other portions being under plated and still other portions being non-plated. This condition occurs as a result of an uneven curent distribution in the cathode forming the metal base. This condition is especially pronounced where the metal has apertures formed therethrough or cavities therein. Consequently, while the plated surfaces will be wetted by the mercury of the amalgam, the non-plated portions will not be wetted by the mercury, and the amalgam will be incapable of intimate contact with the metal base, especially in the cavities or depressions in the metal base. Therefore, such plated layers are of non-uniform thickness over the surfaces.

The present invention deals with a method of bonding an amalgam to a metal base having cavities or depressions therein, wherein the entire surface subjected to plating is plated with a bonding agent in the form of a metal layer having uniform thickness on both the raised and depressed surfaces of the base, or having a uniform thickness on only the walls forming the depressions or cavities if only the cavities or depressions are subjected to plating. The plated base is then provided with a layer of amalgam on the plated surfaces, and the amalgam is bonded to the base by means of the plated layer and in intimate contact, especially intimate thermal contact with the base. The invenion concerns the provision of the plated layer by means of an immersion plating process described in co-pending application Serial No. 653,286, filed April 17, 1957, now abandoned, which described the process of immersion plating a metallic base by cleaning or etching the base and subjecting the cleaned surface to the action of an aqueous solution containing a noble or precious metal compound and a buffering ammonium compound. The term "buffering" refers to a pH adjusted ammonium compound. With the immersion plating process, the metal being plated is provided with a very thin layer or film by chemical replacement, whereby the surface metal of the metal being plated is replaced by the plating solution metal, with the said surface metal going into solution and with cavities as well as raised portions on irregular metal base surfaces being uniformly coated with plating solution metal. However, all metals are not chemically replaceable or exchangeable with immersion solution metals. Examples of metals chemically exchangeable with metal of an immersion type metal plating solution are hereinafter listed. Having plated the metal base with immersion plating solution metal, a layer of amalgam is applied to the plated surfaces and packed into the cavities so that the amalgam is in effective thermal contact with the metal base. The amalgam layer is permitted to set and harden, during which time the mercury of the amalgam combines with the plated layer regardless of the contour and configuration of the metal base surfaces and the amalgam is effectively bonded to the metal base surfaces.

It is an object of the invention to provide a method of bonding amalgam inserts in cavities in a metal base.

It is another object of the invention to provide an amalgam insert bonded to the walls of a cavity in a metal body.

It is a further object of the invention to provide a metal body having a cavity therein with an amalgam cement bonded to the cavity walls.

Other objects and advantages of the invention will become apparent from the description hereinafter following and the drawing forming a part hereof, the drawing illustrating an exaggerated cross-sectional view of a structure in accordance with the invention.

According to the invention, a base body 1 composed of, for example, cadmium, zinc, aluminum and aluminum alloys, low carbon steel, tungsten, die cast metals, solders, pewter, "Alumel" alloy, etc., is provided with at least one cavity 2 and 3. The cavity is first cleaned by well known acid etching procedure and then filled with an aqueous immersion plating solution containing a precious metal soluble compound and a buffering ammonium compound and preferably the addition thereto of a complexing or chelating agent. The body may be heated if desired to heat the solution. The precious metal soluble compound comprises a soluble salt such as potassium gold cyanide, potassium silver cyanide, silver acetate, platinum diamino nitrite, and palladium diamino nitrite. Examples of ammonium compounds are ammonium hydroxide and ammonium citrate. Examples of complexing or chelating agents are urea ethylenedinitrilo tetraacetic acid, cyanoacetamide, sulfosalicylic acid, ethylenediamine and dicyandiamide.

The following are specific examples of immersion plating solutions contemplated:

(1)

| | | |
|---|---|---|
| $KAu(CN)_2$ | gms | 5 |
| Ammonium citrate | gms | 20 |
| Urea | gms | 25 |
| Water | liters | 1 |

(2)

| | | |
|---|---|---|
| $KAu(CN)_2$ | gms | 5 |
| Ammonium citrate | gms | 20 |
| Ethylenedinitrilo tetraacetic acid | gms | 25 |
| Water | liters | 1 |

(6)

| | | |
|---|---|---|
| $KAu(CN)_2$ | gms | 5 |
| Ammonium citrate | gms | 20 |
| Dicyanidiamide | gms | 25 |
| Water | liters | 1 |

(12)

| | | |
|---|---|---|
| Potassium silver cyanide | gms | 5 |
| Ethylenedinitrilo tetraacetic acid | gms | 20 |
| $NH_4OH$ | to pH | 8 |
| Water | liters | 1 |

(13)

| | | |
|---|---|---|
| Silver acetate | gms | 10 |
| Ethylenedinitrilo tetraacetic acid | gms | 30 |
| $NH_4OH$ | to pH | 8 |

(14)

| | | |
|---|---|---|
| Palladium diamino nitrite | gms | 5 |
| Ethylenedinitrilo tetraacetic acid (tetra sodium salt) | gms | 25 |
| $NH_4OH$ | to pH | 9–10 |
| Water | liters | 1 |

(15)

| | | |
|---|---|---|
| Platinum diamino nitrite | gms | 5 |
| Ethylenedinitrilo tetraacetic acid | gms | 25 |
| $NH_4OH$ | to pH | 9–10 |
| Water | liters | 1 |

While the weight of the noble metal compounds is indicated by the above examples at a preferred 5 gm. weight per liter it is, of course, intended that the weight of the noble metal compounds may include from about 10 milligrams to about 30 gms. per liter or more, and the chelating or complexing agents must be present in sufficient amount to complex or chelate all the metal replacing the noble metal in solution. The reaction based on plating gold indicates that at least 1.25 gms. of ethylenedinitrilo tetraacetic acid (tetra sodium salt) is required per gram of gold deposited.

The rate of deposit of the noble metal on the metal base is a function of time and temperature. For example, with the gold baths, the gold is deposited in an amount of about 1 mg. of gold per square inch in one minute and less at a temperature between 90° C. and and 100° C. The same baths at 60° C. require about three minutes for a comparable deposit and at 40° C. the baths require about fifteen minutes for such deposits. Generally, between the temperature range of 20° C. and 100° C. the plating time is between less than 1 minute to about 1 hour.

Advantageously a large excess of chelating or complexing agent is used and as such the chelating or complexing agent is present in an amount of at least three times that of the noble metal compound. Specifically, the chelate-gold compound ratio is at least 3 to 1 regardless of the amounts of other reagents present.

Generally, the immersion plating can be accomplished at temperatures between 20° C. and 100° C. At the lower temperatures, e.g. 25° C. the adherence of gold to the metal base, e.g. nickel, suffers in that such adherence is less desirable than at higher temperatures preferably between 60° C. and 100° C. Silver, on the other hand, works very well at room temperature, e.g. 25° C. The platinum group metals work well at between 60° C.–100° C.

After a sufficient time has elapsed to assure a plated coating 4 and 5 on the walls of the cavity, the plating solution is removed and body 1 dried. Thereafter, the cavities 2 and 3 are packed with an amalgam insert 6 and 7.

Examples of amalgams contemplated are amalgams of silver, gold, palladium, platinum, rhodium, tin, bismuth, etc., in the form of finely divided metal, e.g. powder mixed with sufficient mercury to wet the powder particles. A preferred amalgam is silver amalgam of the type described in Patent No. 1,963,085. The packed amalgam is permitted to set and simultaneously the mercury of the amalgam combines with the plated coating providing an intimate contact between the walls of the cavities and the amalgam inserts 6 and 7.

Prior to completing the packing of the amalgam in the cavities, sensing devices, e.g. thermocouples 8 and 9 are placed into the cavity with the amalgam being packed thereabout and with the thermocouple leads extending outwardly of the cavities. When the amalgam sets, the thermocouples are effectively cemented in the insert bodies and in desirable thermal contact with the metal body 1. In lieu of thermocouples, other members such as wires, studs, pins, and the like may be similarly cemented in the cavities by the amalgam, the cemented members being previously either coated or uncoated with a metal film by immersion plating the member.

Various modifications of the invention are contemplated within the scope of the appended claims.

What is claimed is:

1. A method of cementing an element in a cavity in a metal body to provide good thermal contact of the element with a metal to which an amalgam will not bond but which is chemically exchangeable with a metal to which an amalgam will bond, comprising the steps of cleaning the cavity, filling the cavity with an immersion type plating solution of a metal to which an amalgam will bond and which is chemically exchangeable with the metal of the body, permitting the solution to exchange metal from the cavity wall surfaces with the plating solution metal until a layer of the solution metal is formed on the cavity walls, removing the solution from the cavity, placing an element to be cemented to the body in the cavity along with an amalgam of finely divided metal wetted with mercury, packing the amalgam about the element in the cavity, and permitting the amalgam to set while the mercury of the amalgam combines with the formed metal layer.

2. The method according to claim 1 wherein the immersion plating solution is an acqueous solution of a soluble precious metal compound and a buffered ammonium compound.

3. The method according to claim 2 wherein the immersion plating solution contains a precious metal salt.

4. The method according to claim 2 wherein the immersion plating solution contains a complexing agent.

References Cited in the file of this patent

UNITED STATES PATENTS

| | | |
|---|---|---|
| 2,094,483 | Weder | Sept. 28, 1937 |
| 2,155,274 | Kenak | Apr. 18, 1939 |
| 2,392,917 | Guinee | Jan. 15, 1946 |
| 2,735,050 | Armstrong | Feb. 14, 1956 |
| 2,737,711 | Smith | Mar. 13, 1956 |
| 2,782,492 | Frost | Feb. 26, 1957 |
| 2,856,341 | Kanne | Oct. 14, 1958 |
| 2,915,406 | Rhoda | Dec. 1, 1959 |
| 2,921,972 | Kreisler et al | Jan. 19, 1960 |
| 2,976,180 | Brookshire | Mar. 21, 1961 |
| 2,976,181 | Brookshire | Mar. 21, 1961 |

FOREIGN PATENTS

| | | |
|---|---|---|
| 518,388 | Canada | Nov. 15, 1955 |

OTHER REFERENCES

Automotive Industries, June 15, 1940, pages 573.